(12) United States Patent  
Ueda

(10) Patent No.: US 6,931,417 B2  
(45) Date of Patent: Aug. 16, 2005

(54) KNOWLEDGE INFORMATION MANAGING METHOD, KNOWLEDGE INFORMATION MANAGING APPARATUS, KNOWLEDGE INFORMATION INPUT-OUTPUT APPARATUS, STORAGE MEDIUM STORING KNOWLEDGE INFORMATION MANAGING PROGRAM, AND KNOWLEDGE INFORMATION MANAGING PROGRAM

(75) Inventor: Satoru Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 10/093,595

(22) Filed: Mar. 8, 2002

(65) Prior Publication Data

US 2002/0161773 A1 Oct. 31, 2002

(30) Foreign Application Priority Data

Mar. 14, 2001 (JP) .................................... P2001-072501

(51) Int. Cl.[7] ............................................. G06F 17/30
(52) U.S. Cl. ..................................................... 707/102
(58) Field of Search ..................................... 707/102, 2

(56) References Cited

U.S. PATENT DOCUMENTS

| | | | | |
|---|---|---|---|---|
| 5,778,381 A | * | 7/1998 | Sandifer | 707/104.1 |
| 5,862,325 A | * | 1/1999 | Reed et al. | 709/201 |
| 5,874,953 A | * | 2/1999 | Webster et al. | 715/733 |
| 5,905,866 A | * | 5/1999 | Nakabayashi et al. | 709/223 |
| 5,949,413 A | * | 9/1999 | Lerissa et al. | 715/733 |
| 6,125,388 A | * | 9/2000 | Reisman | 709/218 |
| 6,482,156 B2 | * | 11/2002 | Iliff | 600/300 |
| 6,535,855 B1 | * | 3/2003 | Cahill et al. | 705/1 |
| 2003/0020749 A1 | * | 1/2003 | Abu-Hakima et al. | 345/752 |

* cited by examiner

Primary Examiner—Wayne Amsbury
(74) Attorney, Agent, or Firm—Jay H. Maioli

(57) ABSTRACT

A knowledge information managing apparatus and method that collects and registers knowledge information in a knowledge database, providing users with the convenience of acquiring information efficiently. After the knowledge information is registered, it is then opened in the knowledge database, allowing users to select knowledge information. The selected knowledge information is then registered in a user's knowledge account, where a knowledge account is set up for every user and is a storage area formed in an account database. The apparatus also includes a knowledge information managing program and a storage medium for storing that program.

16 Claims, 13 Drawing Sheets

FIG.3

| IDENTIFICATION NUMBER IN | LATEST ACCESS DATE AND TIME INFORMATION ADI | STATUS INFORMAION SI |
|---|---|---|
| ZQ-9954112100 | 2001.02.14.13.26.22 | UN READ |
| ZQ-9952111011 | 2001.02.14.13.26.22 | UN READ |
| ZG-2251141001 | 2001.02.14.13.26.22 | REGISTERED IN PERSONAL ACCOUNT |
| ZF-1120110011 | 2001.02.14.13.26.22 | DESTROYED |
| ZB-5569854122 | 2001.02.14.13.26.22 | DESTROYED AFTER REGISTERED IN PERSONAL ACCOUNT |
| ZA-0010010001 | 2001.02.14.13.26.22 | REGISTERED IN PERSONAL ACCOUNT AFTER DESTROYED |
| YZ-9650010014 | 2001.02.14.13.26.22 | DESTROYED |
| YY-5521010012 | 2001.02.14.13.26.22 | UN READ |
| ⋮ | ⋮ | ⋮ |

| IDENTIFICATION NUMBER IN | LATEST ACCESS DATE AND TIME INFORMATION |
|---|---|
| AZ-431252144111 | 2000.12.11.13.16.20 |
| AZ-459845221322 | 2001.01.01.01.12.36 |
| AZ-556988787415 | 2001.01.31.13.45.11 |
| PY-123144522102 | 2001.02.01.15.33.11 |
| ZC-889522100121 | 2001.02.02.19.54.33 |
| ZC-889522100121-03 | 2001.02.14.01.00.00 |
| ... | ... |

TD

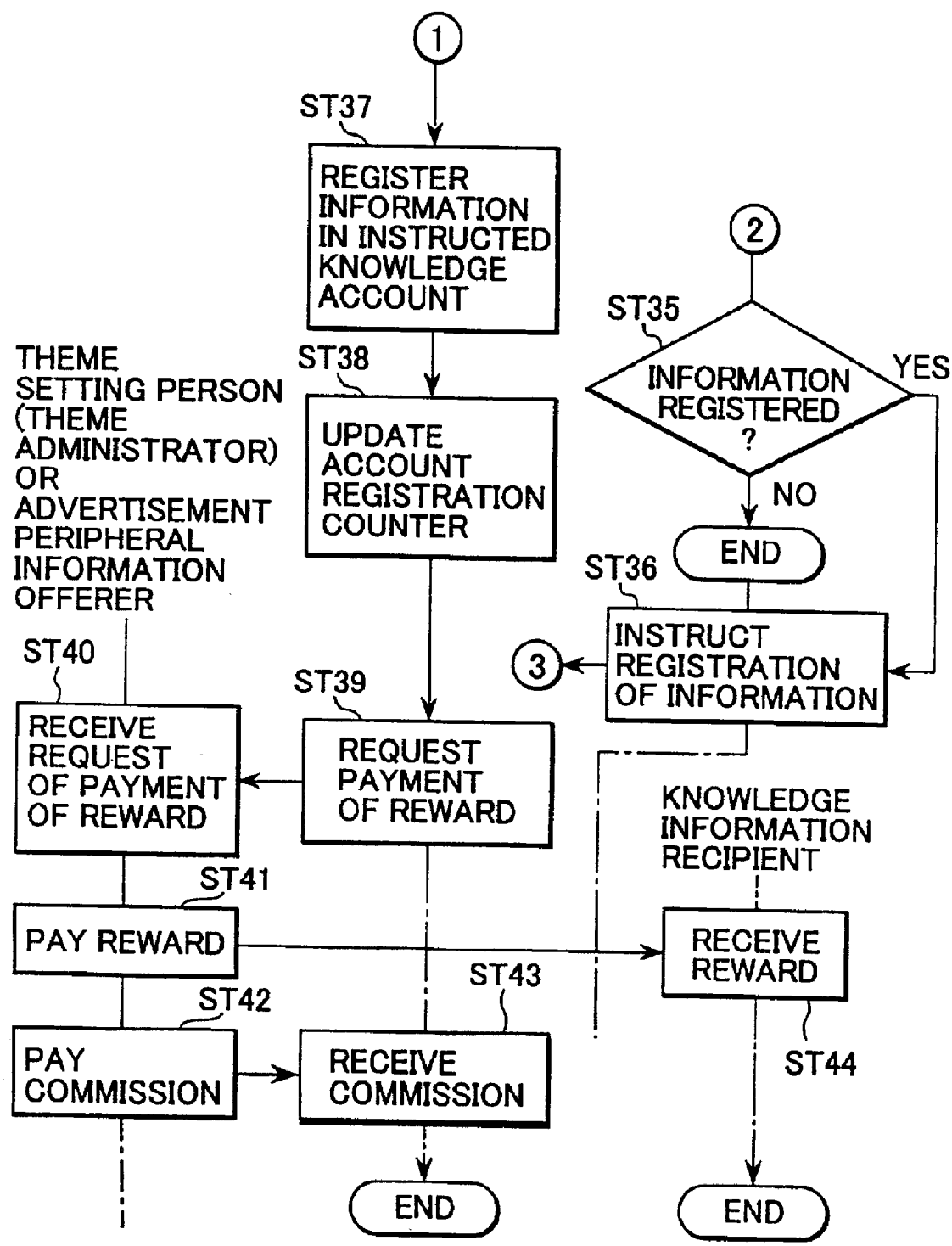

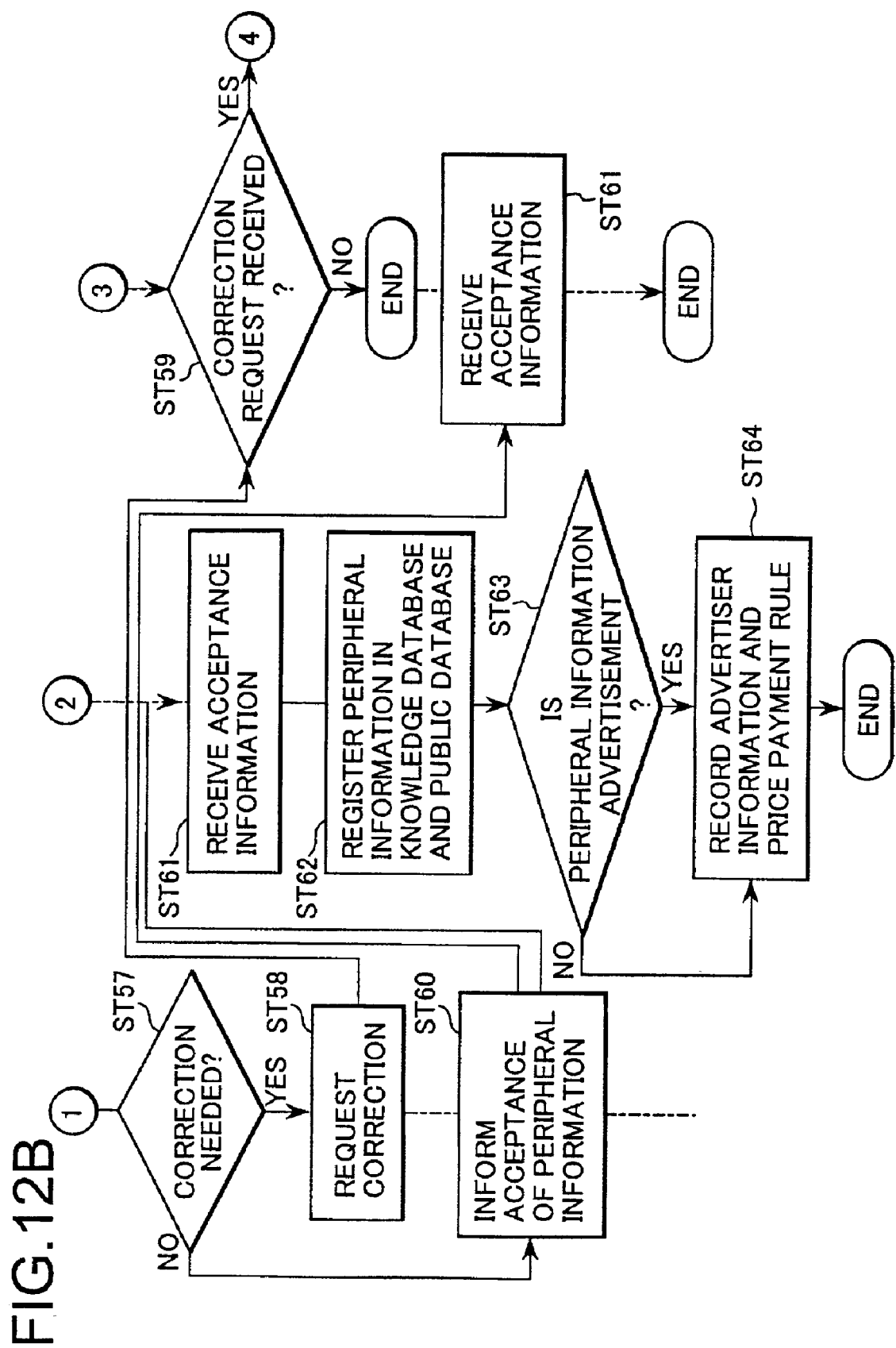

KNOWLEDGE INFORMATION MANAGING METHOD, KNOWLEDGE INFORMATION MANAGING APPARATUS, KNOWLEDGE INFORMATION INPUT-OUTPUT APPARATUS, STORAGE MEDIUM STORING KNOWLEDGE INFORMATION MANAGING PROGRAM, AND KNOWLEDGE INFORMATION MANAGING PROGRAM

CROSS REFERENCES TO RELATED APPLICATIONS

The present document is based on Japanese Priority Document JP 2001-072501, filed in the Japanese Patent Office on Mar. 14, 2001, the entire contents of which being incorporated herein by reference.

BACKGROUND OF THE INVENTION

1. Field of the Invention

The present invention relates to a knowledge information managing method, a knowledge information managing apparatus, a storage medium storing a knowledge information managing program therein, and a knowledge information managing program, all being used for collecting and opening knowledge information in a network such as the Internet.

2. Description of the Related Art

As the Internet becomes popular, distribution of knowledge information can be performed extremely easily. As means for the distribution of knowledge information, for example, means for creating a Web site and for retrieving the Web site, a bulletin board system (BBS), means for mailing a plurality of persons registered in advance at the same time (mailing list), and the like are generally used. For example, if a person wants to acquire the knowledge information which the person wants to know, the person can acquire the target information by performing, for example, keyword retrieving by means of a search engine of the Internet. Moreover, if a person has some information which the person wants to introduce to other people, the person can transmit the information via the Internet by making a Web site of the person himself or herself.

Moreover, if a person wants to deliver the same information to all of the members belonging to a certain group, the person can deliver the same information to a plurality of people at a time using the system of a mailing list. Furthermore, if a person submits a theme (generates a thread) as to a thing which the person cannot know, in a bulletin board system (BBS), the person may acquire useful information from writings by a plurality of people.

Now, an Internet browser software is used for browsing the data opened, that is, made public, in the Internet. The browser has a bookmark function, which makes it possible to record a uniform resource locator (URL) of a Web site opening the information which a user thinks usable to the public or the like.

For example, if "otitis media" is retrieved using a search engine, several thousands of pieces of information are provided. Consequently, there is a problem such that a user has to browse the thousands of Web sites one by one for acquiring a usable piece of information and it requires much time. Moreover, among the pieces of information provided in the Web sites hit by the retrieval, sometimes there are conflicting pieces of information, which make the user confuse with regard to which to believe.

Besides, when the user originates a piece of information, the user has to follow the steps of making data in conformity with, for example, the hypertext markup language (HTML) format or the like and registering the data on a Internet server. Furthermore, when the user updates the originated information, the user has to follow the steps of rewriting the data by the HTML format and registering the updated data in the Internet server. Thus, the conventional system also has a problem of the required time also at the time of originating information.

Moreover, in a case of the bulletin board system, when a plurality of responses are obtained, there is a problem of time required for finding out a useful piece of information among the responses even if the useful information is included in the thread, in other word, the response writings concerning a target subject. Furthermore, meaningless notes aiming intrusion of the bulletin board are frequently made. Besides, in the so-called mailing list system, the information unnecessary for a recipient is also sent indiscriminately, and consequently originally necessary information is frequently hidden.

Furthermore, in a case where so many bookmarks are registered, it becomes difficult to find what kind of information the registered Web sites provide when a user tries to obtain a useful piece of information by using the bookmark function of a browser, and consequently the registrations of the Web sites as the bookmarks becomes meaningless. Moreover, there is a further problem such that, when a Web site to which a bookmark is marked is updated, a user has no means for acquiring the updated information except for accessing the Web site again.

On the other hand, there are few means for evaluating the contribution of the person who supplied a useful piece of information on a network such as the Internet or the like, and such a network system is wholly supported by gratuitous information providing actions. Moreover, there are special kinds of information desired to be accompanied by introductions of related articles or services. In such cases, it is preferable to attach advertisements to the information, but no standard method for the attachment is established.

Furthermore, there is the specific information the value of which is heightened by the attachment of another piece of information, but no standard means for connecting the attachment information with the original information is established. Even if knowledge information has been updated under some circumstance, it is difficult for a recipient of the knowledge information to know suitably and rapidly.

SUMMARY OF THE INVENTION

The present invention is made to provide a knowledge information managing method, a knowledge information managing apparatus, a storage medium storing a knowledge information managing program, and a knowledge information managing program, all of which can solve the aforesaid problems, and can acquire knowledge information efficiently, and further can improve user's convenience.

According to a first aspect of the present invention, there is provided a knowledge information managing method comprising the steps of: registering knowledge information in a knowledge database; opening the knowledge information registered in the knowledge database; and registering the knowledge information selected by a user among the opened knowledge information in a knowledge account being a storage area formed in an account database, the knowledge account being set to every user.

According to the first aspect of the present invention, the user selects the knowledge information which the user thinks useful for the user from the knowledge information registered in the knowledge database. And the user registers the selected knowledge information in a knowledge account for managing the knowledge information. Thus the user registers the knowledge information necessary for the user in the knowledge account, and thereby the user can efficiently extracts only useful knowledge information among many pieces of knowledge information to browse the extracted knowledge information.

Moreover, according to a second aspect of the present invention, there is provided a knowledge information managing apparatus comprising: a knowledge database for storing knowledge data therein; knowledge judging means for selecting knowledge information by examining the knowledge information to be registered in the knowledge database for registering the selected knowledge information in the knowledge database; account managing means for registering the useful knowledge data extracted from the knowledge database in a knowledge account provided in an account database, the knowledge account having a fixed storage area; and knowledge opening means for opening the knowledge data stored in the knowledge database.

Moreover, according to a third aspect of the invention, there is provided an information storage medium storing a knowledge information managing program, the program is for working a computer as: a knowledge database for storing knowledge data therein; knowledge judging means for selecting knowledge information by examining the knowledge information to be registered in the knowledge database for registering the selected knowledge information in the knowledge database; account managing means for registering the useful knowledge data extracted from the knowledge database in a knowledge account provided in an account database, the knowledge account having a fixed storage area; and knowledge opening means for opening the knowledge data stored in the knowledge database.

Moreover, according to a fourth aspect of the invention, there is provided a knowledge information managing program for working a computer as: a knowledge database for storing knowledge data therein; knowledge judging means for selecting knowledge information by examining the knowledge information to be registered in the knowledge database for registering the selected knowledge information in the knowledge database; account managing means for registering the useful knowledge data extracted from the knowledge database in a knowledge account provided in an account database, the knowledge account having a fixed storage area; and knowledge opening means for opening the knowledge data stored in the knowledge database.

According to the second to the fourth aspects of the invention, a user selects knowledge information which the user thinks useful for himself or herself among knowledge information registered in the knowledge database. And, the user registers the selected knowledge information in the knowledge account, and manages the knowledge information. Thus, the user registers the knowledge information which is important for the user in the knowledge account, and thereby the user can efficiently extracts only the useful knowledge information among many pieces of knowledge information to browse the extracted knowledge information.

Moreover, because the knowledge information to be registered in the knowledge database is the knowledge information examined by the knowledge judging means, the knowledge information does not include meaningless knowledge information. Consequently, the user can efficiently collect knowledge information.

Moreover, when the knowledge information is registered in the knowledge database, the knowledge information is registered as knowledge data composed of the knowledge information and respective knowledge data information including an identification number. Thereby, each knowledge information is stored in the knowledge database in a state capable of being identified on the basis of the identification number.

Moreover, when the knowledge data are registered in the knowledge database, the knowledge data are also registered in an open database being opened to public for storing the knowledge data by classifying them to each theme, in other words, each subject; and the knowledge data are opened at every theme data of the open database. By the registration of the knowledge information into the open database at every theme data in such a way, the knowledge information can be supplied at every theme data when the knowledge information is opened.

Moreover, only the knowledge data information having the identification number is registered in the open database, and the knowledge data is called out from the knowledge database on the basis of the identification number to open the called knowledge data. By the registration of only the knowledge data information in the open database, a load imposed on the open database can be reduced.

Moreover, when the knowledge data is registered in the knowledge database, the contents of the knowledge data are examined, and it is judged whether the knowledge data should be registered or not. Thereby, the quality of the knowledge information to be registered in the knowledge database can be ensured.

Moreover, when the knowledge information is registered in the knowledge database, the personal information of the user who requests the registration of the knowledge information is acquired, and the number of times of registration of the knowledge data is measured on the basis of the acquired personal information. Thereby, for example, an individual who frequently registers knowledge information in the knowledge database can be specified.

Moreover, only the knowledge data information of the knowledge data is registered in the knowledge account. Thereby, a load of the account database storing the knowledge account can be reduced.

Moreover, the knowledge account includes an open account in which the registered knowledge data is made open to public. The knowledge data are opened at each open account. Thereby, a plurality of pieces of knowledge information acquired from the knowledge database can be opened in a state of being arranged. For example, in the knowledge information concerning certain theme data, only the knowledge information related to the theme data more closely can be collected to be opened.

According to a fifth aspect of the present invention, there is provided a knowledge information input-output apparatus comprising: knowledge information acquiring means for acquiring knowledge data including knowledge information and an identification number attached to each knowledge information; display means for displaying the knowledge information; and knowledge information selecting means for generating a knowledge information log indicating an operation history of the knowledge information, and for selecting the knowledge data not displayed on the display means from a plurality of the knowledge data acquired by the knowledge information acquiring means on a basis of the knowledge information log.

According to the fifth aspect of the present invention, the knowledge information acquiring means acquires the knowledge data from, for example, a network or the like, and sends the acquired knowledge date to the knowledge information selecting means. The knowledge information selecting means extracts the knowledge data not displayed by the display means among the acquired knowledge data to make the display means display the extracted knowledge data. And consequently, a user can obtain the displayed knowledge information. At this time, the knowledge information selecting means generates the information concerning the displayed knowledge data as a knowledge information log. In such a way, by the display of only the knowledge information not opened by the user, the user can efficiently collect the knowledge information.

As described above, the present invention can provide a knowledge information managing method, a knowledge information managing apparatus, a storage medium storing a knowledge information managing program, and a knowledge information managing program, all being capable of obtaining knowledge information efficiently and improving the convenience of a user.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 3 is a view showing an example of a knowledge information log LG stored in the knowledge information input-output apparatus of FIG. 2;

DESCRIPTION OF THE PREFERRED EMBODIMENTS

Hereinafter, a preferable embodiment of the present invention is described on the basis of the attached drawings. Incidentally, because the embodiment described in the following is a preferable exemplum of the present invention, the embodiment includes technically preferable various limitations. However, the scope of the present invention is not limited to the exemplum including the limitations except that the special statement for the limitation of the scope of the present invention is made in the following description.

Figure 1:
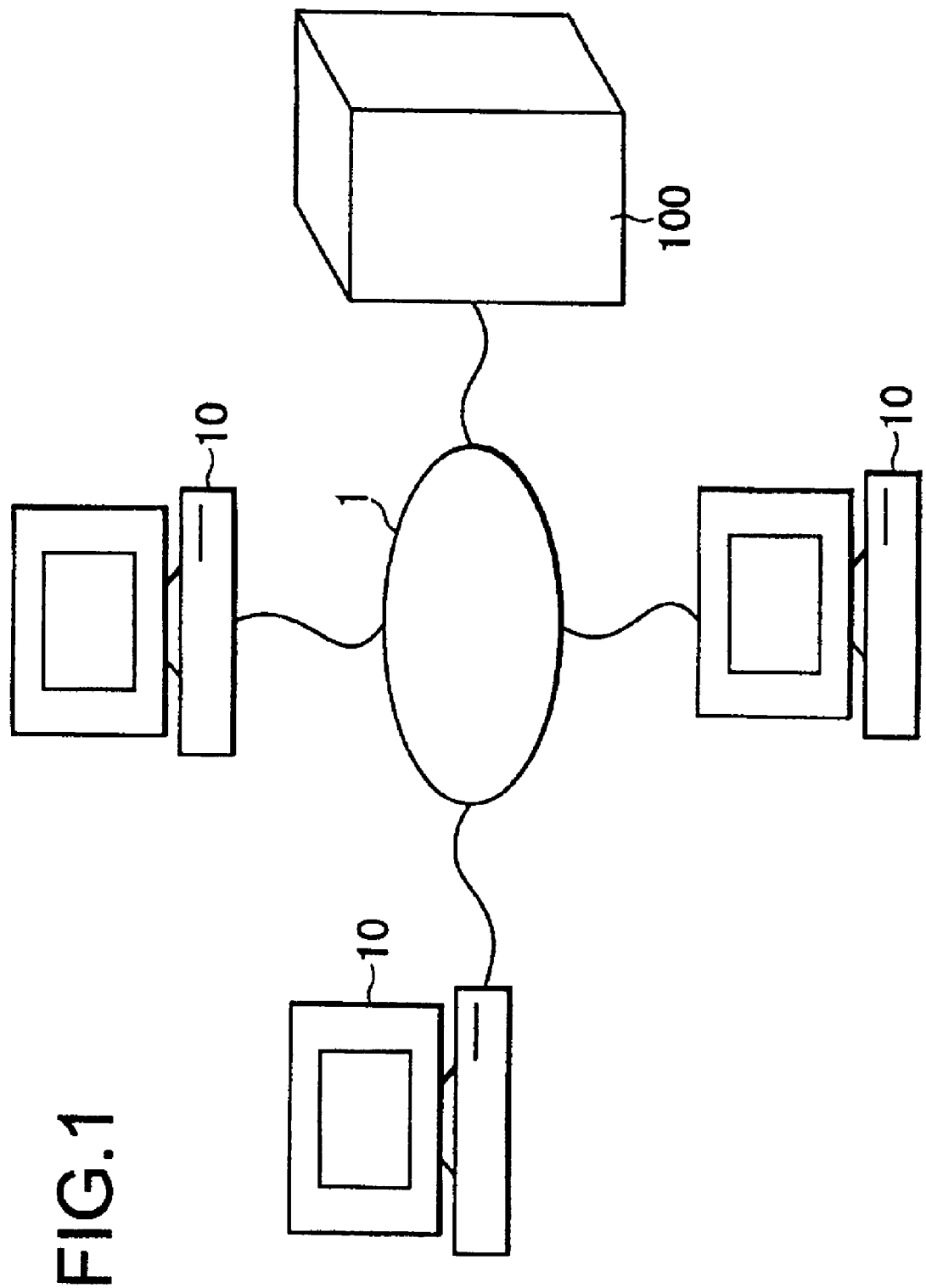
FIG. 1 is a network diagram showing a preferable embodiment of a knowledge information managing apparatus of the present invention.

FIG. 1 is a network diagram showing a preferable embodiment of a knowledge information managing apparatus of the present invention. FIG. 1 is referred while the knowledge information managing apparatus 100 is described.

In FIG. 1, the knowledge information managing apparatus 100 is configured to be capable of executing transmission and reception of information between a plurality of knowledge information input-output apparatuses 10 through a network 1. And a user can browse and obtain knowledge information KI stored in the knowledge information managing apparatus 100 by means of a knowledge information input-output apparatus 10. Moreover, the knowledge information managing apparatus 100 is configured to enable the user to register the knowledge information KI which the user wants to open to public in the knowledge information managing apparatus 100 by means of the knowledge information input-output apparatus 10 for delivering knowledge data KD on the network 1.

Figure 2:
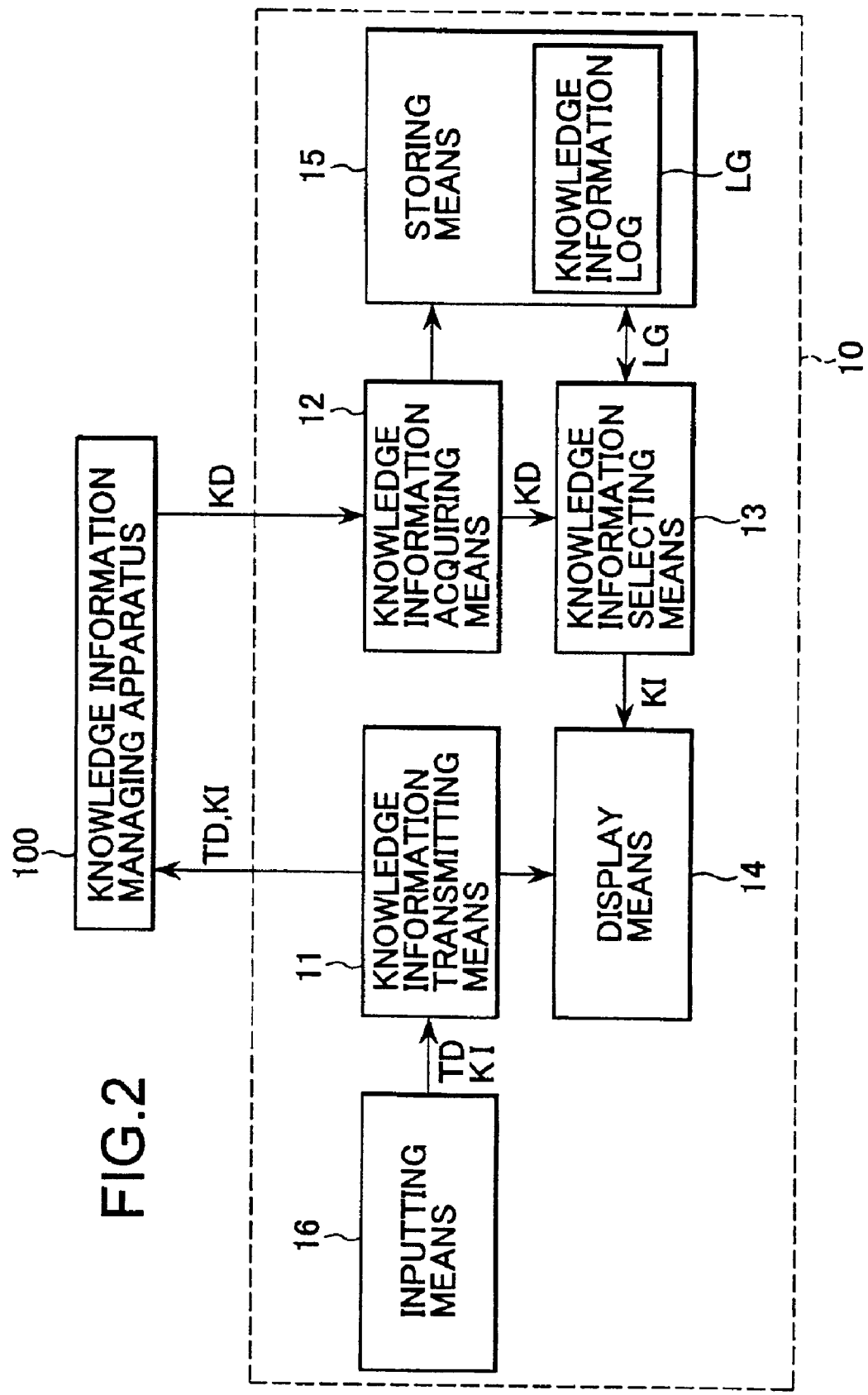
FIG. 2 is a block diagram showing an example of a knowledge information input-output apparatus for browsing knowledge information registered in the knowledge information managing apparatus of the present invention.

FIG. 2 is a block diagram showing an example of the knowledge information input-output apparatus 10. FIG. 2 is referred while the knowledge information input-output apparatus 10 is described. As described above, the knowledge information input-output apparatus 10 is composed of electric equipment such as a personal computer, a portable terminal and the like, and a functional configuration shown in FIG. 2 is realized by the execution of a knowledge information input-output program by a central processing unit (CPU).

The knowledge information input-output apparatus 10 includes knowledge information transmitting means 11, knowledge information acquiring means 12, knowledge information selecting means 13, and the like. The knowledge information transmitting means 11 transmits data to the knowledge information managing apparatus 100. The knowledge information transmitting means 11 has a function of transmitting the knowledge information KI input from inputting means 16 such as a keyboard, a microphone, or the like to the knowledge information managing apparatus 100. Moreover, the knowledge information transmitting means 11 transmits theme data TD to the knowledge information managing apparatus 100 when the transmitting means 11 sets the theme data TD in the managing apparatus 100. Herein, the theme data TD means information concerning a target subject of the knowledge information.

The knowledge information acquiring means 12 has a function of acquiring the knowledge data KD from the knowledge information managing apparatus 100 and transmitting the acquired knowledge data KD to the knowledge information selecting means 13. The knowledge information selecting means 13 has a function of selecting a piece of knowledge information KI to be displayed on display means 14 among pieces of knowledge information KI acquired by the knowledge information acquiring means 12 on the basis of knowledge information log LG stored in storing means 15. The knowledge information log LG will be described below.

The storing means 15 is composed of, for example, a hard disk device, an optical disk device or the like, and has a function of storing data. The storing means 15 especially stores the knowledge information log LG indicating historical information of the knowledge data KD browsed by the user. The knowledge information log LG indicates a state of utilization of the knowledge data KD utilized by the user, and has the data structure as shown in FIG. 3. In FIG. 3, the knowledge information log LG includes identification numbers IN, the latest access date and time information ADI and status information SI. The identification numbers IN indicate the identification numbers IN of accessed pieces of knowledge information KI. The latest access date and time information ADI indicates the latest access dates and times to pieces of the knowledge information KI. The status information SI indicates the statuses of the pieces of the knowledge information KI. That is, the status information SI includes statuses such as "unread", "registered", "destroyed", and the like that indicate disposals of the pieces of the knowledge information KI by the user.

Now, the knowledge information log LG does not include the information body of the knowledge information KI, and stores the identification numbers IN related to the knowledge information KI. Consequently, the file capacity of the knowledge information log LG can be reduced.

As described above, the knowledge information selecting means 13 selects the knowledge information KI to be provided to the knowledge information input-output apparatus 10 by means of the knowledge information log LG. In specific, the knowledge information selecting means 13 is configured to select only the unread knowledge information KI on the basis of the knowledge information log LG. Thereby, for example, the knowledge information KI that has once been browsed and has been judged to be unnecessary for the user can be made not to be displayed by the display means 14. Consequently, the user can always obtain only new pieces of the knowledge information KI from the knowledge information managing apparatus 100 always. Hence, the collection of information can efficiently be performed.

Next, FIG. 2 is referred while an example of the operations of the knowledge information input-output apparatus 10 is described.

At first, when a piece of knowledge information KI is acquired from the knowledge information managing apparatus 100, a request of the acquisition of the knowledge information KI is made by the knowledge information transmitting means 11 to the knowledge information managing apparatus 100. Then, the knowledge information managing apparatus 100 transmits knowledge data KD capable of being browsed by the user to the knowledge information acquiring means 12. And, the acquired knowledge data KD is transmitted to the knowledge information selecting means 13.

After that, the knowledge information selecting means 13 refers to the knowledge information log LG while extracting the knowledge information KI the status information SI of which indicates not opened and the knowledge information KI of a browsable knowledge account KA. Then the extracted knowledge information KI is transmitted to the display means 14 to be supplied to the user. Because only the unread knowledge information KI is supplied to the user in such a way, the user can easily perform the collection work of the knowledge information KI. That is, the present embodiment saves the user the trouble of retrieving the information useful to the user among a thread, which is necessary in a case of the information retrieval by the conventional bulletin board system (BBS). Consequently, the user can efficiently collect the useful information.

Next, an example of the operation of the embodiment when a piece of knowledge information KI is registered in the knowledge information managing apparatus 100.

At first, the user inputs the knowledge information KI which the user wants to register to the knowledge information input-output apparatus 10 by means of the inputting means 16. After that, the knowledge information transmitting means 11 transmits the input knowledge information KI to the knowledge information managing apparatus 100. Then, the knowledge information managing apparatus 100 informs the user of the propriety of the registration of the knowledge information KI by, for example, electronic mail. Then the registration of the knowledge information KI is completed.

Figure 4:
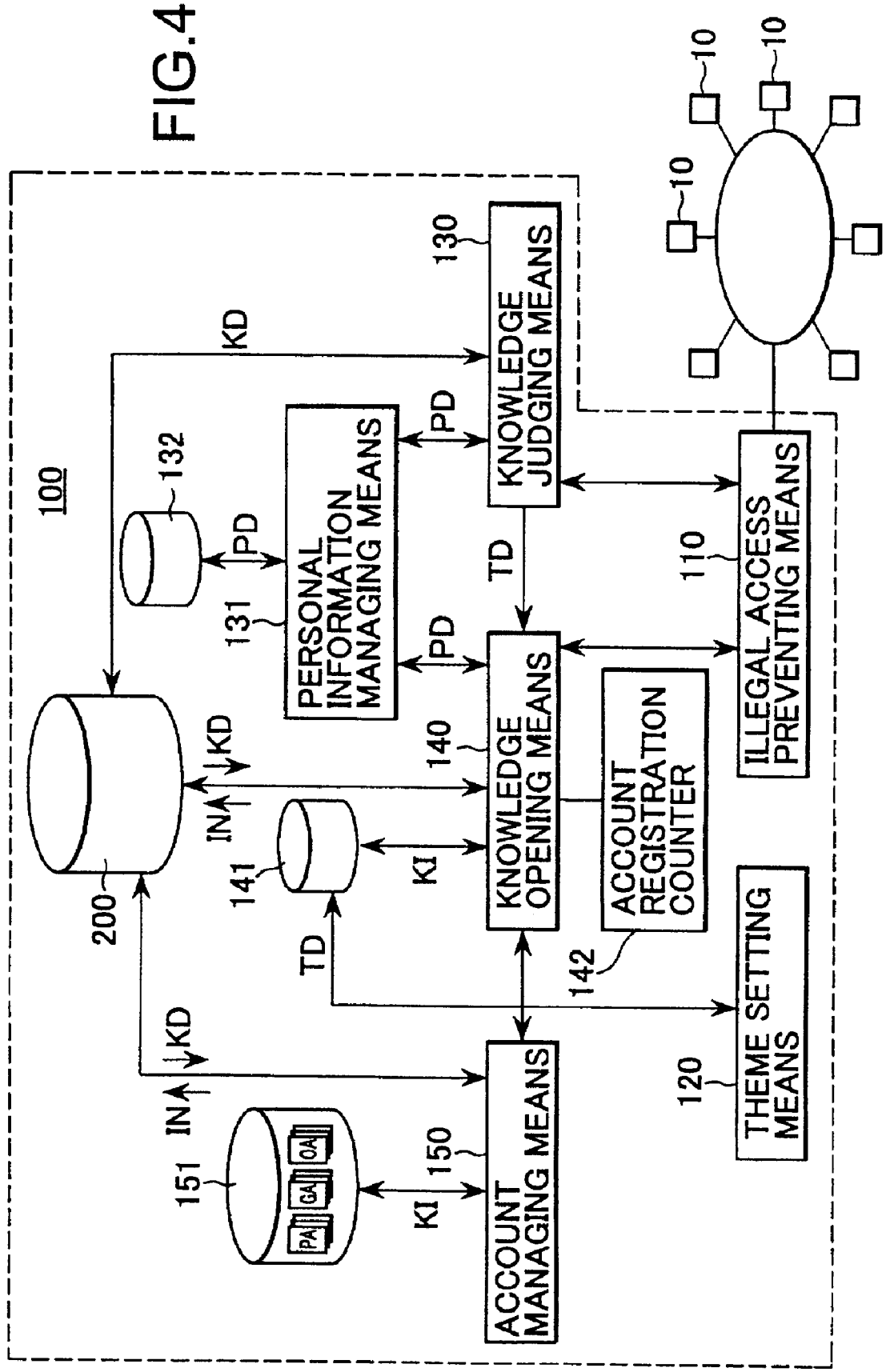
FIG. 4 is a schematic diagram showing the preferable embodiment of the knowledge information managing apparatus of the present invention.

FIG. 4 is a schematic diagram showing the preferable embodiment of the knowledge information managing apparatus 100 of the present invention. FIG. 4 is referred while the knowledge information managing apparatus 100 is described. Incidentally, a functional configuration of the knowledge information managing apparatus 100 shown in FIG. 4 can be realized by the execution of an information processing program stored in the hard disk device being an auxiliary storage apparatus by the CPU. Moreover, the program storage medium used for installing the program for the execution of the following series of processing into a computer to make the program be in a state capable of being executed by the computer may be realized by not only a package medium such as a floppy disk, a compact disc read-only memory (CD-ROM), a digital versatile disk (DVD) and the like, but also by a semiconductor memory, a magnetic disk and any further possible media, in which a program is temporarily or permanently stored. As means for storing a knowledge information managing program in those program storage media, a cable communication medium and a radio communication medium such as a local area network (LAN), the Internet, a digital satellite communication and the like may be used, or various communication interfaces such as a router, a modem and the like may also be intervened between a program supplier and the program storage media.

The knowledge information managing apparatus 100 shown in FIG. 4 collects knowledge information KI through a network such as the Internet, a LAN and the like, and evaluates the value of the collected knowledge information KI, and further distributes the evaluated knowledge information KI to a person who needs the information KI. In specific, the knowledge information managing apparatus 100 includes illegal access preventing means 110, theme setting means 120, knowledge judging means 130, knowledge opening means 140, account managing means 150, a knowledge database 200 and the like.

The illegal access preventing means 110 is for preventing an illegal access to the knowledge database 200, and has a function of authenticating an access by means of, e.g. a user ID and a password. By the provision of the illegal access preventing means 110, the security of the knowledge information KI in the knowledge database 200 is secured. The theme setting means 120 has a function of receiving the theme data TD transmitted from the knowledge information input-output apparatus 10 to register the received theme data TD in an open database 141. The open database 141 is a database open to public. The theme data TD is the information which a user wants to adopt as a theme, that is, a subject.

An example of the theme data TD is "What is your knowledge source?", or the like. The knowledge information KI concerning the theme data TD is collected to the knowledge information managing apparatus 100. Then, the open database 141 manages the collected knowledge information KI at, for example, every theme data TD.

The setting of the theme data TD means formation of a knowledge market for delivering the knowledge information KI in the knowledge information managing apparatus 100. That is, the knowledge information KI is collected in the knowledge information managing apparatus 100 by a user's registration of the knowledge information KI owned by a user who has seen a certain theme data TD to the knowledge information managing apparatus 100. On the other hand, the registration enables a person who wants to obtain the registered knowledge information KI concerning the set theme data TD to acquire a new piece of knowledge information KI by browsing the collected knowledge information KI or inputting the collected knowledge information KI into a knowledge account KA, which will be described later.

The knowledge judging means 130 has a function of transmitting the knowledge information KI transmitted from the knowledge information input-output apparatus 10 to a person who examines the knowledge information KI for judging the value of the knowledge information KI being wanted to be registered in the knowledge database 200. The person who examines the knowledge information KI may be, for example, an administrator of the knowledge information managing apparatus 100, or the person who set the theme data TD. The configuration capable of examining the knowledge data KD to be registered in the knowledge database 200 makes it possible to store only the knowledge data KD judged to have a fixed value into the knowledge database 200. Consequently, the quality of the knowledge data base 200 can be improved. Moreover, the registration of the meaningless pieces of knowledge information KI in a case of the so-called bulletin board intrusion in a bulletin board system (BBS) or the like can previously be prevented, and the convenience of a user can be improved.

Furthermore, the knowledge judging means 130 is configured to register the knowledge information KI judged to be capable of being registered by an examination in the form of knowledge data KD formed by the attachment of header data HD, that is, additional knowledge information to the knowledge information KI into the knowledge database 200. Moreover, the knowledge judging means 130 has a function of transmitting the header data HD to the knowledge opening means 140. Then, the knowledge opening means 140 stores the header data HD into the open database 141.

Figures 5, 6:
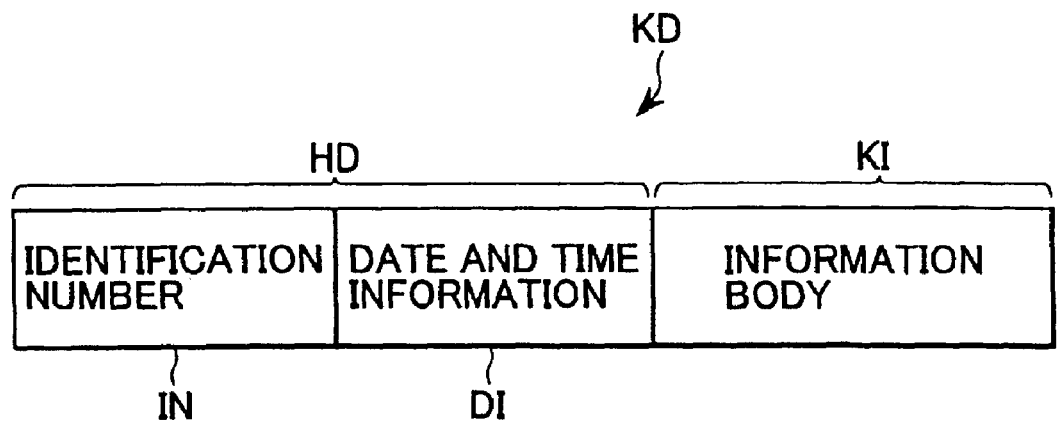
FIG. 5 is a diagram showing a data structure of knowledge data registered in a knowledge database in the knowledge information managing apparatus of the present invention.
FIG. 6 is a view showing the data structure of knowledge data registered in a knowledge account in the knowledge information managing apparatus of the present invention.

The knowledge data KD to be registered into the knowledge database 200 has a data structure as shown in FIG. 5. In FIG. 5, the knowledge data KD includes the header data HD and the knowledge information KI. In the columns of the header data HD, the information concerning input knowledge information KI is input, and then the header data HD includes, for example, identification number IN, date and time information DI and the like.

The identification number IN is for discriminating the acquired knowledge information KI in the knowledge database 200. Each knowledge data KD has a different identification number IN. In particular, if the identification number IN is numbered to include the theme data TD, the theme of knowledge information KI can be discriminated by the analysis of the identification number IN thereof. The date and time information DI indicates a date and a time when knowledge information KI is registered or updated into the knowledge database 200. The knowledge information KI is an information body desired to be registered into the knowledge database 200 and to be opened. The knowledge information KI is composed of, for example, text information, voice information, image contents or the like.

Moreover, the knowledge judging means 130 has a function of transmitting personal data PD of the user who input the knowledge information KI to personal information managing means 131. The personal data PD includes personal information. The personal information managing means 131 has a function of managing the number of times of the user's registrations on the transmitted personal data PD. And further, the personal information managing means 131 has a function of registering the personal data PD and the number of times of the registrations to a personal information database 132. The personal data PD of the user who frequently performs registrations is made to be capable of opening to users through the knowledge opening means 140.

Thereby, the user who wants to acquire knowledge information KI can acquire the information of the user who frequently performs the registration of knowledge information KI. Consequently, when a so-called "power user" who frequently performs registration is known, another user can directly acquire knowledge by accessing the power user (or an expert in a specific field) about the knowledge information KI not registered in the knowledge database 200.

The knowledge opening means 140 is for opening the knowledge information KI registered in the open database 141 to users. The knowledge opening means 140 is configured to shape knowledge data KD in a form capable of being browsed with, for example, a browser by means of Java, Computer Graphics Interface (CGI), or the like. Only the header data HD is registered in the open database 141. The knowledge opening means 140 is configured to acquire knowledge information KI from the knowledge database 200 on the basis of the identification number IN in the header data HD and open it. Thus the knowledge information KI is not registered in the open database 141, but only the header data HD is registered therein. Consequently, a load of the open database 141 can be reduced.

The account managing means 150 has a function of managing an account database 151. In the account database 151, a storage area called as the knowledge account KA is set to every user who uses the knowledge information managing apparatus 100. The account managing means 150 has a function of performing the management of setting the knowledge account KA, registering and deleting data to each knowledge account KA, and the like.

As the data to be stored in the knowledge account KA, as shown in FIG. 6, the identification numbers IN of knowledge data KD, latest access dates and times, and the like are stored, but the information bodies of the knowledge data KD are not stored. When the knowledge data KD in each knowledge account KA is called out, the account managing means 130 acquires the information bodies from the knowledge database 200 on the basis of the identification numbers KA written in the knowledge account KA. Thereby, simplification of the account database 150 can be achieved.

In the knowledge account KA of each user shown in FIG. 5, for example, a personal account PA, an group account GA and an open account OA are set. In the personal account PA, the identification numbers IN of the knowledge data KD acquired by the user from opened knowledge data KD in the knowledge database 200 when the user judged the knowledge data KD to be useful, and the like are stored. That is, the valuable knowledge information KI is thus different to every user. Thus, a personal account PA is prepared for each user and knowledge data KD in the knowledge database 200 are managed on the basis of the personal account PA. Consequently, the convenience can be improved.

The group account GA is a storage area owned commonly by an organization such as a section of a company, a circle or the like to which the user belongs. The group account GA is configured to be used by only the members belonging to the organization. Thus, owing to the group account GA being provided in the knowledge account KA, knowledge data KD desired to be informed to the members of the organization can commonly be owned only by being registered in the group account GA. The open account OA is an area where the knowledge data KD which the user wants to open with the knowledge opening means 140, which will be described later, is stored. The knowledge data KD judged by the knowledge judging means 130 to be capable of being registered in the knowledge database 200 may be registered in the open account OA as well as in the knowledge database 200.

As described above, if a user only stores the knowledge data KD which the user wants to open to public in the open account OA, the knowledge data KD is opened by the knowledge opening means 140. That is, if the user wants to open the knowledge data KD to public on a network, the user conventionally has to make data in, for example, the HTML format, and to register the data in a network server. Moreover, if the knowledge data KD is updated, the user conventionally has to change the data of the HTML format one by one. On the other hand, in FIG. 1, if the knowledge data KD is registered in the open account OA, the knowledge data KD is opened on the network, and the updating of the knowledge data KD can also be made by the updating of the knowledge data KD in the open account OA. Consequently the convenience of the user can be improved.

Moreover, if the theme data TD is set to be a subject concerning an area, for example, "About Tokyo", there is a case where not only the information about the area but also the knowledge information KI such as restaurants serving delicious foods or the like are registered. Consequently, it is possible to expand the theme data TD to the knowledge information KI in various fields. Moreover, it is supposed that the knowledge information KI concerning the restaurants serving delicious foods in Tokyo has been registered as the knowledge information KI in the various fields on the one hand, and that a certain user has registered a piece of knowledge information KI under the concept of restaurants serving delicious foods in areas not limited to Tokyo in the open account OA on the other hand. Then, it becomes possible for the user to collect only the information concerning the restaurants serving delicious foods in Tokyo in the theme data TD of "about Tokyo" and to open the collected information to supply the information to other users.

An account registration counter 142 can access to the account managing means 150. The account registration counter 142 has a function of counting value points VP of the registered knowledge information KI when a user requests the user's registration to the knowledge account KA to the knowledge opening means 140. The value point VP is added at every registration of the knowledge information KI to the knowledge account KA. Incidentally, the number of points may be changed according to a knowledge account KA to be registered in such a way that: when the knowledge information KI is registered in the personal account PA, the number of points is +1; when the knowledge information KI is registered in the group account GA, the number of points is +2; and when the knowledge information KI is registered in the open account OA, the number of points is +5.

Such calculations of the value point VP of each knowledge information KI make it possible to provide the materials for the judgment of the usefulness of the knowledge information KI. Consequently, it becomes possible for a user to utilize the value points VP as one of materials on which the user judges the execution of the registration of the knowledge information to the personal account PA. Consequently, the convenience of the user can be improved.

Moreover, the account registration counter 142 has also a function of counting the number of persons who have registered knowledge information KI in the knowledge account KA. To read how many information recipients have registered knowledge information KI in the knowledge account KA makes it possible to know how many people have judged the knowledge information KI to be the information which is "put to good use later by all means". Consequently, the counted value can be used as an index of the judgment of the value of knowledge information.

Figure 7:
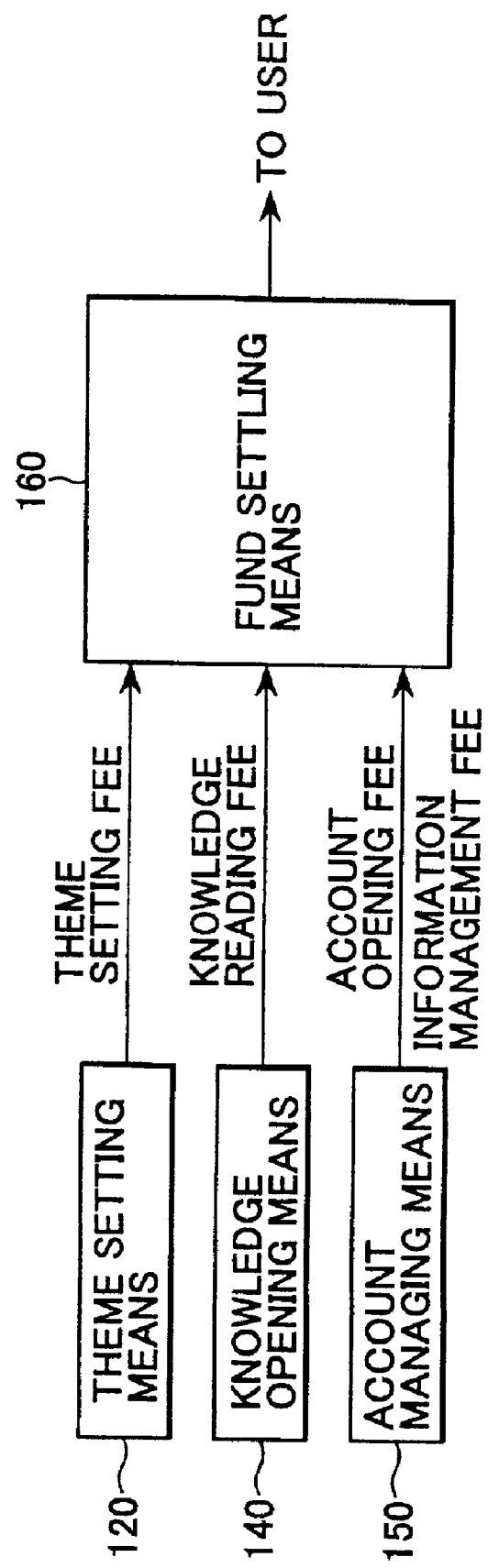
FIG. 7 is a block diagram showing fund settling means in the knowledge information managing apparatus of the present invention.

As shown in FIG. 7, the theme setting means 120, the knowledge opening means 140 and the account managing means 150 are respectively connected with fund settling means 160. The fund settling means 160 is for paying a price to a user using the knowledge information managing apparatus 100, or for requesting the payment. In specific, when new theme data TD is set, the theme setting means 120 requests the collection of the theme setting fee for the setting of the theme data TD to the fund settling means 160.

Moreover, if the knowledge information KI was browsed, or if the knowledge information KI was registered in the knowledge account KA, the knowledge opening means 140 or the account managing means 150 requests the collection of a knowledge reading fee or a subscription fee of the knowledge information KI from the person who acquired the knowledge information KI to the fund settling means 160, and requests the payment of the price of the knowledge information KI to the offerer of the knowledge information KI. The fund settling means 160 is configured to collect a charge from a user or to pay the price by means of, for example, an electronic business transaction, electric commerce or the like.

Figure 8:
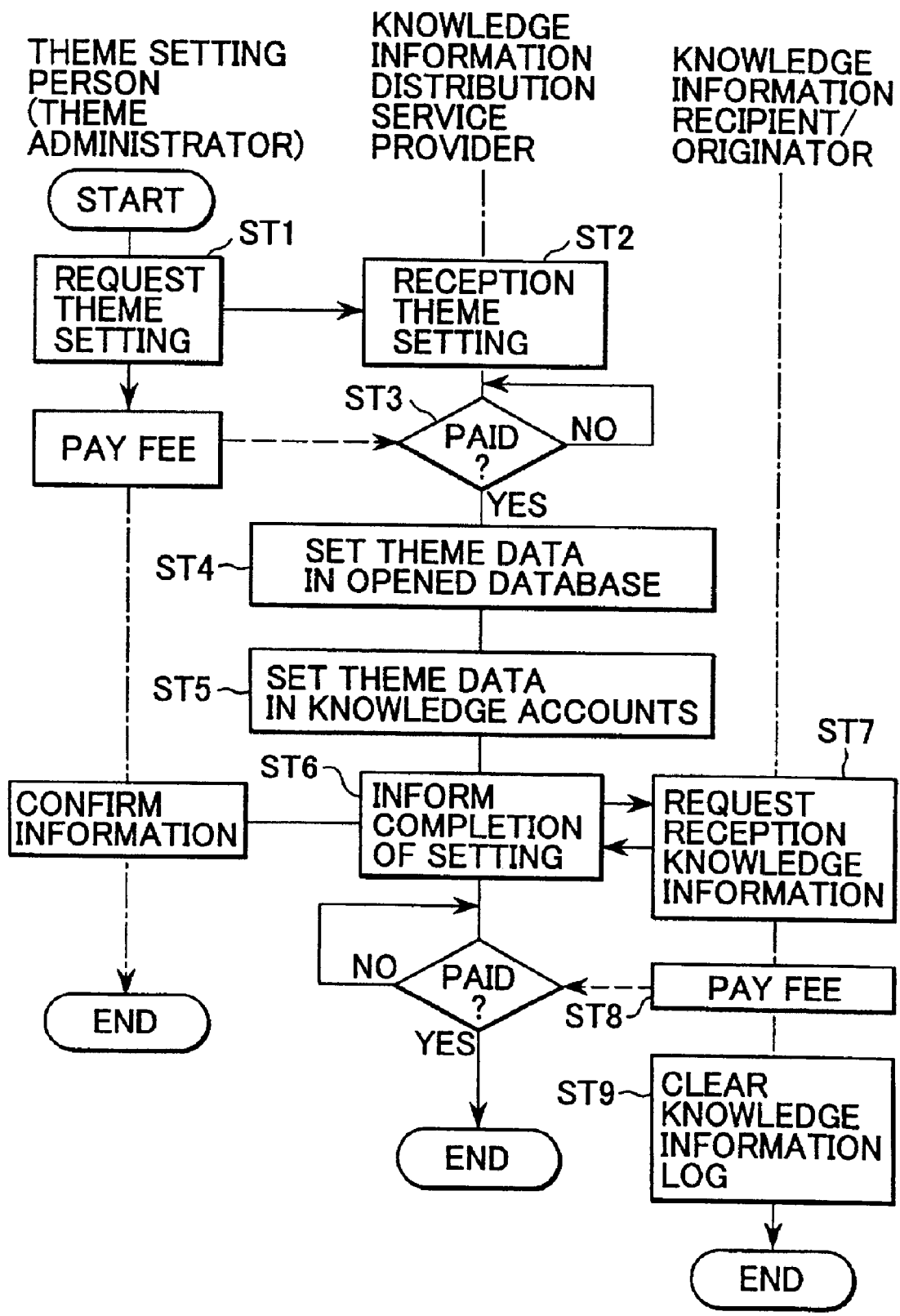
FIG. 8 is a flowchart showing a preferable embodiment of a knowledge information managing method of the present invention.

Next, FIG. 8 to FIG. 11 shows flowcharts of an embodiment of the knowledge information managing method of the present invention. FIG. 8 to FIG. 11 are referred while the knowledge information managing method is described. At first, FIG. 8 is referred for describing the method for setting theme data TD in the knowledge database 200.

At first, the setting of theme data TD such as "how to breed a kitten" is requested by a person from the knowledge information input-output apparatus 10 shown in FIG. 4 to the knowledge information managing apparatus 100 (Step ST1). Then, the theme setting means 120 receives the setting of the theme data TD (Step ST2). After that, it is judged whether a theme setting fee has been paid by the person who set the theme to the fund settling means 160 or not (Step ST3). It is preferable that such a theme setting person is an administration responsible person such as an administrator in actual workings.

When the theme setting fee has been paid, the theme setting means 120 forms the theme data TD concerning the theme the setting of which has been requested in the open database 141. At this time, a certain storage area in the open database 141 is secured as an area for storing the header data HD concerning the theme data TD (Step ST4).

Next, the account managing means 150 sets new theme data TD in each account in the account database 150 (Step ST5). Thereby, a user having an account can know the setting of the new theme by confirming the user's account. It is preferable to configure the system such that the setting of the new theme data TD can be performed only to a person who has justly received a right for receiving the information delivery of the set theme by, for example, paying a membership fee or the like. Incidentally, there may be a case where a membership fee is paid to the theme setting person and a knowledge information distribution service provider receives a part of the membership. After that, the information concerning the setting of the theme data TD is transmitted to users, and the setting of the theme data TD is informed to, for example, a user utilizing the knowledge information managing apparatus 100 through the knowledge account KA of the user (Step ST6). Thereby, the theme data TD is set in the public database 200, and a knowledge market is opened.

When the user wants to acquire the knowledge information KI of the newly set theme data TD, the user pays a predetermined entry fee to the knowledge information managing apparatus 100 (Step ST7, Step ST8). Then, when the fund settling means 160 confirms the payment of the entry fee, the opened knowledge information KI concerning the newly set theme can be browsed with the knowledge opening means 140. At this time, the knowledge information log LG of the theme data TD is generated in the knowledge information input-output apparatus 10 of the user, and the contents of the knowledge information input-output apparatus 10 are initialized (Step ST9).

Figure 9:
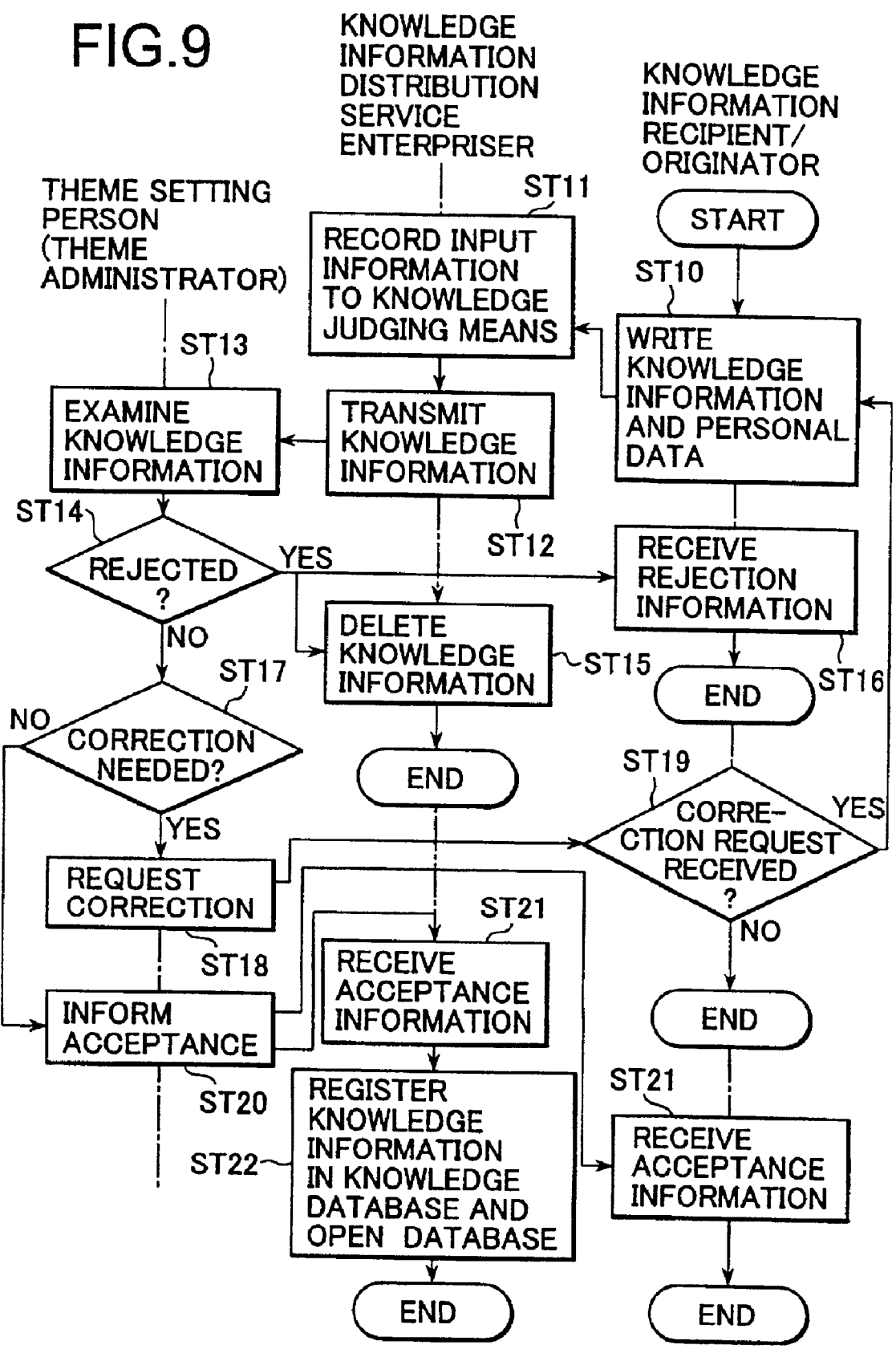
FIG. 9 is another flowchart showing the preferable embodiment of the knowledge information managing method of the present invention.

Next, FIG. 9 is referred while a method for registering the knowledge information KI in the open database 141 and the knowledge database 200 is described.

At first, a person who wants to register the knowledge information KI in the knowledge database 200 to open the knowledge information KI to public accesses the knowledge information managing apparatus 100 by means of the knowledge information input-output apparatus 10. Then, the knowledge judging means 130 of the knowledge information managing apparatus 100 requests input of the personal data PD of the person who wants to register the knowledge information KI and input of the knowledge information KI to the user. Then the user inputs the personal data PD and the knowledge information KI (Step ST10), and transmits the input personal data PD and the knowledge information KI to the knowledge judging means 130 (Step ST11).

After that, the knowledge judging means 130 transmits the input knowledge information KI to the person who judges whether to register the transmitted knowledge information KI or not, for example, the theme setting person of the theme data TD (Step ST12). In this instance, there may be a case where, when the knowledge judging means 130 receives some notes, the knowledge judging means 130 informs a notes to the theme setting person by electronic mail or the like to urge to begin an examination. Then, the theme setting person examines the knowledge information KI (Step ST13) to judge whether to reject the knowledge information KI or not (Step ST14). As a result of the examination, if the theme setting person thought that it was unnecessary to register the knowledge information KI or that it was preferable not to register the knowledge information KI, the theme setting person transmits a notice of the rejection to the knowledge judging means 130 (Step ST15). And, the knowledge judging means 130 makes a rejection notice indicating rejection of the registering in a form of, for example, electronic mail or the like, and the knowledge judging means 130 transmits the made rejection information to an applicant for registration of the knowledge information KI (Step ST16).

On the other hand, as a result of the examination, if the theme setting person judges that the knowledge information KI may be registered in the knowledge database 200 but the correction thereof is necessary (Step ST17), for example, the theme setting person requests the correction thereof to the knowledge judging means 130 (Step ST18). Then, the knowledge judging means 130 makes a notice indicating necessity of the correction thereof in the form of, for example, electronic mail or the like, and the knowledge judging means 130 transmits the notice to the applicant for registration of the knowledge information KI (Step ST19). After that, the applicant for registration again inputs corrected knowledge information KI (Step ST10), and the corrected knowledge information KI is examined. Incidentally, the correction of the knowledge information KI may entirely be left to the theme setting person.

Moreover, as a result of the examination, if the theme setting person judges that the knowledge information KI may be registered in the knowledge database 200 as it is (Step ST20), a notice is transmitted to the knowledge judging means 130. Then, the knowledge judging means 130 transmits a notice indicating completion of registration to the applicant for registration by, for example, electronic mail or the like (Step ST21). Moreover, the knowledge judging means 130 generates knowledge data KD composed of the input knowledge information KI including header data HD attached thereto, and the knowledge judging means 130 registers the generated knowledge data KD in the knowledge database 200. Moreover, the header data HD of the knowledge information KI to be registered is registered in the open database 141 (Step ST22). Thereby, the registered knowledge information KI takes the state capable of being opened.

Figure 10A:
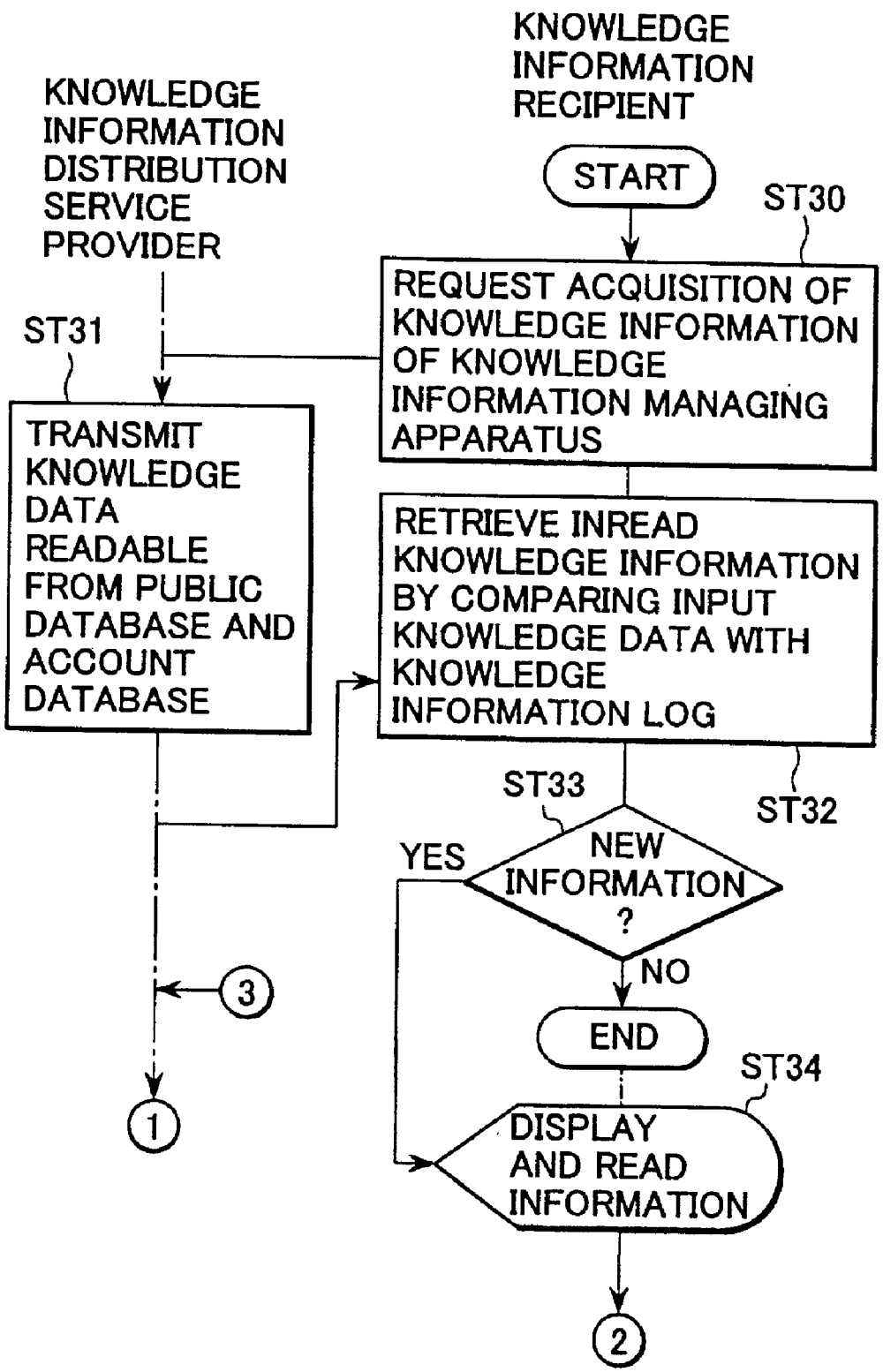
FIG. 10 is a further flowchart showing the preferable embodiment of the knowledge information managing method of the present invention.

Next, FIG. 10 is referred while the distribution of the registered knowledge information KI is described.

At first, the knowledge information input-output apparatus 10 of the user requests the acquisition of the knowledge information KI to the knowledge opening means 140 (Step ST30). Then, the knowledge opening means 140 retrieves the identification number IN of the knowledge information KI capable of being browsed by the user from the open database 141. And, the knowledge opening means 140 acquires the knowledge information KI corresponding to the retrieved identification number IN from the knowledge database 200. Furthermore, the account managing means 150 retrieves the knowledge account KA capable of being browsed by the accessing user. Then, the retrieved knowledge information KI or the theme data TD is transmitted to the knowledge opening means 140 (Step ST31).

Then, the knowledge opening means 140 shapes the retrieved knowledge information KI, the theme data TD and the information of the knowledge account KA to transmit the shaped pieces of information to the knowledge information input-output apparatus 10. And, the knowledge information input-output apparatus 10 retrieves the knowledge information KI which the user has not read yet on the basis of the knowledge information log LG (Step ST32). Then, the display means 14 of the knowledge information input-output apparatus 10 displays a display screen as shown in FIG. 11, for example.

Figure 11:
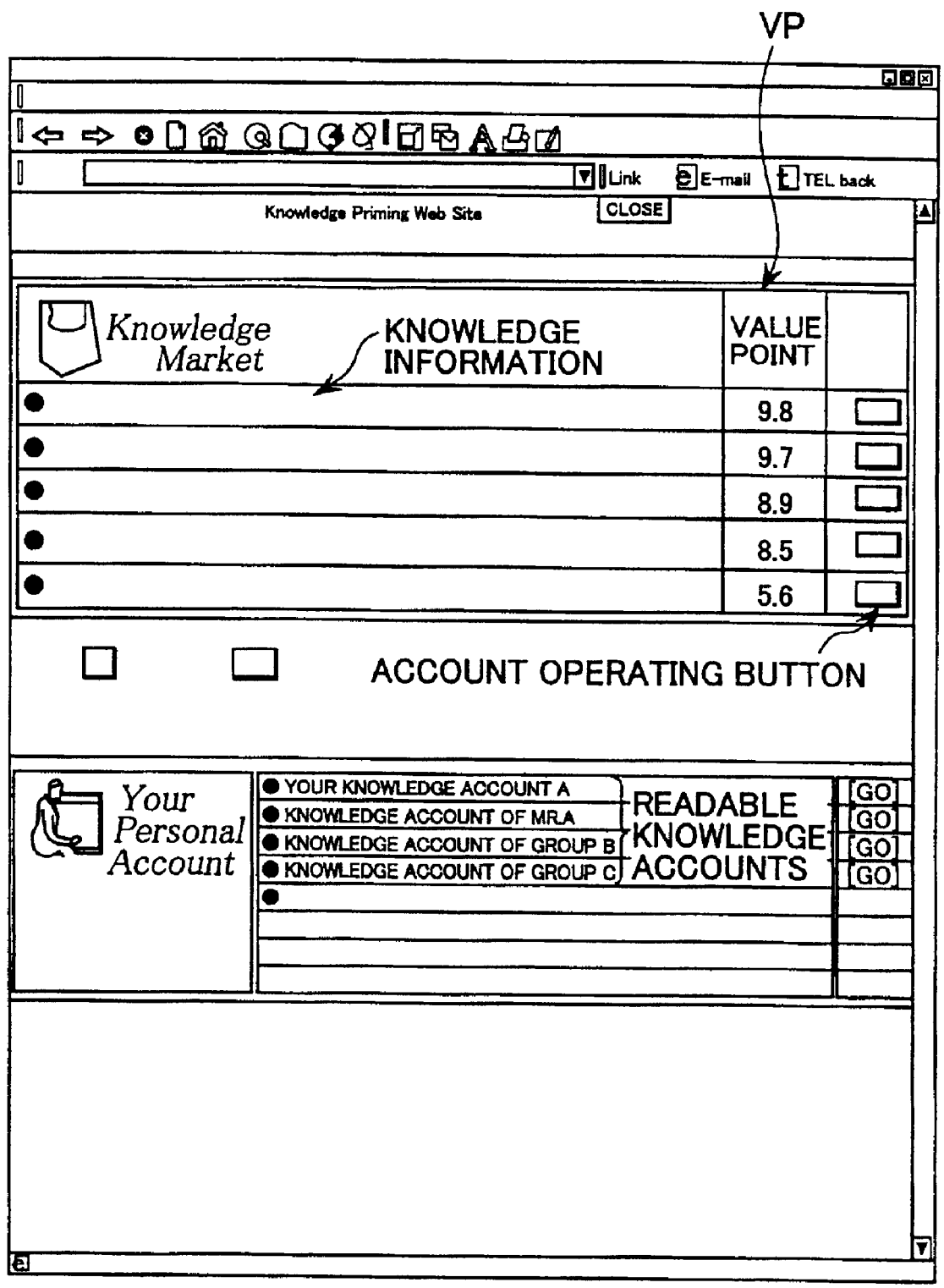
FIG. 11 is a view showing an example of a display screen displayed on the display means of the knowledge input-output apparatus according to the knowledge information managing method of the present invention.

Now, FIG. 11 displays respective lists of the new knowledge information KI acquired from the open database 141 and knowledge accounts KA browsable by a user. Then, respective value points VP and account operating buttons are disposed on, for example, the right side of each knowledge information KI. In the figure, although there is no precise description in the column for the knowledge information KI, in the practical use, some comments are shown in each column. In addition, there may be shown the number of persons who rated the knowledge information KI together with each value point VP. The value point VP of each knowledge information KI is thus displayed, and consequently, the judgment materials of the usefulness of each knowledge information KI can be supplied. Hence it becomes possible for a user to utilize the value points VP as one of the judgment materials of whether to register the knowledge information KI in the knowledge account KA or not. The user can select operation such as paying fee for registration of the knowledge information KI in his or her knowledge account KA or cancelling registration with the account operating buttons. Thereby, the convenience of the user can be improved.

Moreover, if the user again wants to browse the knowledge information KI, the browsing can be realized by confirming the contents of the knowledge accounts KA which the recipient can access. At that time, it is possible to delete the knowledge information KI which becomes useless already as long as the knowledge information KI is that the recipient has registered. If a theme has a sponsor, there may be a case where a reward or the like is paid to an information offerer in conformity with the value point VP of the account registration counter 142.

When knowledge information KI is requested to be registered in the knowledge account KA, the account registration counter 142 judges whether the knowledge information KI has previously registered or not on the basis of the knowledge information log LG thereof. And, if the account registration counter 142 judges that the knowledge information KI has no results of previous registering on the basis of the record of the knowledge information log LG, the account registration counter 142 adds a value point VP. Moreover, a user can know how many people have judged a certain piece of knowledge information KI to be "put to good use later by all means" by reading how many information recipients have registered in the account from the account registration counter 142. Consequently, the value points VP can be made an index of the value judgment of knowledge information KI.

Then, an information recipient of FIG. 4 browses the displayed knowledge information KI, and requests the registration of the necessary knowledge information KI in a predetermined knowledge account KA to the knowledge information managing apparatus 100 (Step ST36). Then, the knowledge opening means 140 registers the information that the information recipient personally wants to store in a personal account PA, and registers the information that should be owned commonly to the organization or group to which each information recipient belongs in a predetermined group account GA (Step ST37). Moreover, the knowledge opening means 140 registers the knowledge information KI evaluated to be known to the other people by all means in the open account OA. When the knowledge information KI is registered in the knowledge account KA, only the identification number IN thereof and the access date and time information is to be registered. Thereby, the recording area of the account database 151 can not be wasted.

Figure 12A:
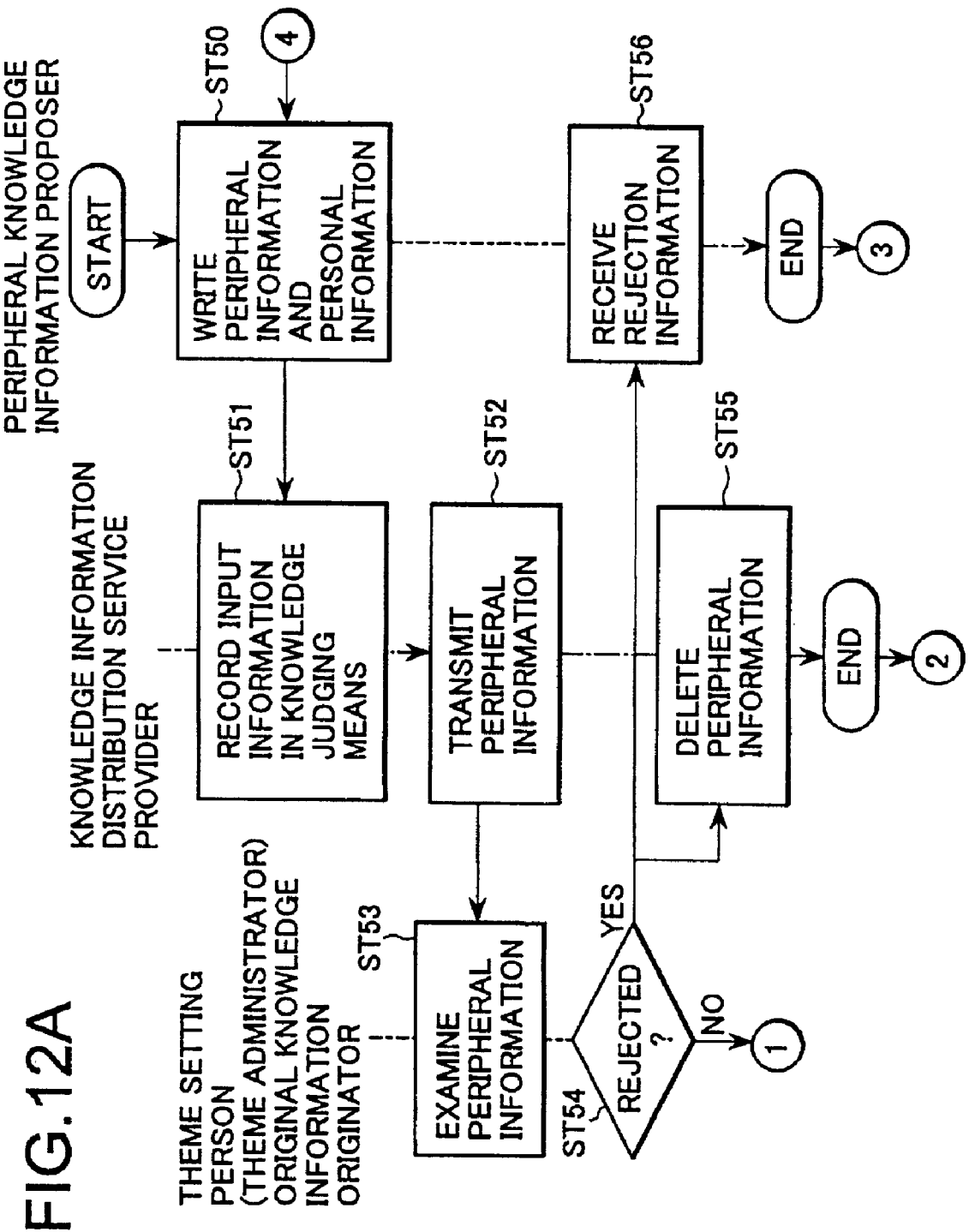
FIG. 12 is a still further flowchart of the preferable embodiment of the knowledge information managing method of the present invention.

Next, FIG. 12 is referred while a method for attaching peripheral information concerning the knowledge information KI is described. Hereupon, the peripheral information means, for example, advertisements of articles and services concerning a theme.

At first, a person who wants to open peripheral information PI in the knowledge database 200 accesses the knowledge information managing apparatus 100 by means of the knowledge information input-output apparatus 10. Then, knowledge judging means 130 of the knowledge information managing apparatus 100 requests a user to input the personal data PD of the person who wants to register the peripheral information PI and to input the peripheral information PI. The user inputs the personal data PD and the peripheral information PI in accordance with the request (Step ST50), and the input personal data PD and the peripheral information PI are transmitted to the knowledge judging means 130 (Step ST51).

After that, the knowledge judging means 130 transmits the input peripheral information PI to the person who judges whether to register the peripheral information or not, for example, a person who set the theme data TD (Step ST52). In this instance, there may be a case where, when the knowledge judging means 130 receives some notes, the knowledge judging means 130 informs the notes to the theme setting person by electronic mail or the like to urge to begin an examination.

Then, the theme setting person examines the peripheral information PI (Step ST53) to judge whether to reject the peripheral information PI or not (Step ST54). As a result of the examination, if the theme setting person determines that it is unnecessary to register the peripheral information PI or that it is preferable not to register the peripheral information PI, the theme setting person transmits a notice of the rejection to the knowledge judging means 130 (Step ST55). And, the knowledge judging means 130 makes a notice indicating rejection of the registering in a form of, for example, electronic mail or the like, and the knowledge judging means 130 transmits the notice to the applicant for registration of the peripheral information PI (Step ST56).

On the other hand, as a result of the examination, if the theme setting person judges that the peripheral information PI may be registered in the knowledge database 200 but the correction thereof is necessary (Step ST57), for example, the theme setting person requests the correction thereof to the knowledge judging means 130 (Step ST58). Then, the knowledge judging means 130 makes a notice indicating necessity of the correction thereof in the form of, for example, electronic mail or the like, and the knowledge judging means 130 transmits the made information to the applicant for registration of the peripheral information PI. After that, the applicant for registration again inputs corrected peripheral information PI (Step ST50), and the corrected peripheral information PI is examined. Incidentally, the correction of the peripheral information PI may entirely be left to the theme setting person.

Moreover, as a result of the examination, if the theme setting person judges that the knowledge information KI may be registered in the knowledge database 200 as it is (Step ST60), a notice is transmitted to the knowledge judging means 130. Then, the knowledge judging means 130 transmits a notice indicating completion of registration to the applicant for registration by, for example, electronic mail or the like (Step ST61). Moreover, the knowledge judging means 130 generates knowledge data KD composed of the input peripheral information PI including header data information HD attached thereto, and the knowledge judging means 130 registers the generated knowledge data KD in the knowledge database 200. Moreover, the header data HD of the peripheral information PI to be registered is registered in the open database 141 (Step ST62). Thereby, the registered peripheral information PI takes a state capable of being opened. Moreover, when the peripheral information PI is an advertisement (Step ST63), the fund settling means 160 requests the price of the advertisement to an advertiser thereof (Step ST64).

Incidentally, if the peripheral information PI is, for example, the introduction of an article or a service, it is preferable to pay a reward to a proposer of the knowledge information KI which makes the occasion of the issue of the peripheral information PI according to the degree of the distribution of the peripheral information PI. As for the distribution of the peripheral information PI, the degree of the distribution can be seen by the counted value of the account registration counter 142 of the peripheral information PI. There may be a case where, when the counted value of the account registration counter 142 has changed, the peripheral information offerer should pay the price to the above-mentioned proposer at a predetermined rate according to the changed counted value. There may be also a case where a knowledge information distribution service provider takes a predetermined commission at that time. Moreover, means for informing the person who hopes to supply such peripheral information PI of the degree of the largeness of the value points VP given to various pieces of information may be provided. The means can easily be realized by, for example, the Web.

According to the aforesaid embodiment, the conventional problem of a "jumble of wheat and tares" in the distribution of knowledge information in the Internet can be eased or solved. Moreover, the problem of the excessive transportation of information which a recipient does not need also can be eased or solved. Moreover, "by whom the knowledge information is originated or mediated" can be known, and an information originator can expect to emphasize authorization of the information originator received from all the world in the Internet world being in the "jumble of wheat and tares". Consequently, it is expected that the quality of the knowledge information distributed in the Internet can greatly be improved.

Furthermore, the present embodiment makes it possible to give an economic value to information, and has the possibility of reforming the knowledge information presentation method in the present Internet supported by the information presenting actions based on good wills without compensation drastically. On the other hand, the embodiment can provide a remarkably effective medium as an advertisement medium. Moreover, the browser software of the Internet has the function of "bookmark", and consequently has means for making a memorandum of information. However, when the stored bookmarks increase, it becomes almost impossible to arrange them. Then, the bookmarks frequently become almost useless. However, the introduction of the knowledge accounts KA solves the problem, and further an effect such that the personally collected knowledge information KI can commonly owned by many people is also brought about.

Moreover, there is a case where a piece of information is attached to another specific information to heighten the value of the specific information. Accordingly, the present embodiment can realize standard means for relating peripheral information PI to knowledge information KI. Then, when the knowledge information KI has been updated under some circumstances, it becomes possible that a recipient of the knowledge information KI suitably and rapidly knows the update.

The embodiment of the present invention is not limited to the embodiment described above. For example, in FIG. 5, when knowledge data are registered in the knowledge database 200, knowledge information KI is examined by means of the knowledge judging means 130. However, the knowledge information KI may be registered in the knowledge database 200 without being examined. Moreover, in FIG. 2, the knowledge information log LG is recorded on the side of the knowledge information input-output apparatus 10. However, the knowledge information log LG may be stored in, for example, the personal account PA of each user for making it possible that a user receives the knowledge information KI while referring the knowledge information log LG.

Furthermore, the selection of the knowledge information KI to be supplied to a user is performed on the side of the knowledge information input-output apparatus 10 by means of the knowledge information log LG. However, the knowledge information KI may previously be selected to the knowledge information input-output apparatus 10 by means of the knowledge opening means 140. Thereby, the quantity of data to be transmitted through the network 1 can be decreased. Consequently, the knowledge information KI can be transmitted at a high speed.

There may be also a case where a person other than a recipient registers knowledge information KI to a knowledge information receiving software apparatus and the knowledge information KI is displayed after the examination the contents of a knowledge account, which the recipient can also access, including updated contents. It is preferable that the object account of examination can arbitrary be set when the open account OA of other person is examined.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A knowledge information managing method comprising the steps of:

registering knowledge information in a knowledge database;

opening the knowledge information registered in the knowledge database based on a theme selected by a user; and registering the knowledge information associated with the theme selected by the user and opened in the step of opening in a knowledge account, wherein the knowledge account is a storage area formed in an account database for every user, the knowledge information associated with the theme selected by the user is assigned a value point based on a number of times the knowledge information is stored in the knowledge account, and the knowledge information is displayed along with the value point, thereby providing the user with information to evaluate the usefulness of the knowledge information.

2. The knowledge information managing method according to claim 1, wherein said step of registering the knowledge information in the knowledge database includes:

registering the knowledge information as knowledge data composed of the knowledge information and respective additional knowledge information including an identification number.

3. The knowledge information managing method according to claim 2, wherein:

said step of registering the knowledge information in the knowledge database includes the step of registering the additional knowledge information in an open database, wherein a certain piece of theme data is registered, for every theme data; and said step of opening the knowledge information includes the steps of:

acquiring the knowledge information from the knowledge database based on the identification number stored in the database; and opening the knowledge information acquired in the step of acquiring the knowledge information from the knowledge database for every theme data.

4. The knowledge information managing method according to claim 1, wherein said step of registering the knowledge information in the knowledge database includes the steps of:

examining contents of the knowledge information; and judging whether the knowledge information is to be registered based on a result of said step of examining.

5. The knowledge information managing method according to claim 1, wherein said step of registering the knowledge information in the knowledge database includes the steps of:

acquiring personal data of a user who requests registration of knowledge information; and measuring a number of times of registration of the knowledge information at every acquired personal data.

6. The knowledge information managing method according to claim 1, wherein said step of registering the knowledge information in the knowledge account includes registering only additional knowledge information of the knowledge information in the knowledge account.

7. The knowledge information managing method according to claim 1, wherein:

the knowledge account includes an open account for opening registered knowledge information, and said method further comprises the step of opening the registered knowledge information at every open account.

8. The knowledge information managing method according to claim 1, wherein:

said step of opening the knowledge information and said step of registering the knowledge information in the knowledge account includes the step of recording a knowledge information log indicating a usage history of the knowledge information by the user; and said step of opening the knowledge information includes supplying only unread knowledge information that the user has yet browsed based on the knowledge information log.

9. A knowledge information managing apparatus comprising:

a knowledge database for registering knowledge information therein;

knowledge opening means for opening the knowledge information registered in the knowledge database based on a theme selected by a user;

account managing means for registering the knowledge information associated with the theme selected by the user and opened by the knowledge opening means in a knowledge account, wherein the knowledge account is a storage area formed in an account database for every user, the knowledge information associated with the theme selected by the user is assigned a value point based on a number of times the knowledge information is stored in the knowledge account, and the knowledge information is displayed along with the value point, thereby providing the user with information to evaluate the usefulness of the knowledge information.

10. The knowledge information managing apparatus according to claim 9, wherein the knowledge information is composed of an information body, and additional knowledge information including an identification number for each knowledge information.

11. The knowledge information managing apparatus according to claim 10, wherein said knowledge opening means accesses an open database, wherein the additional knowledge information of the knowledge data is registered in said knowledge database for every theme data, for opening the knowledge data based on the open database.

12. The knowledge information managing apparatus according to claim 9, wherein said knowledge judging means is connected with personal information managing means for acquiring personal data of a user who has requested registration of the knowledge data to measure number of times of registration of the knowledge information at every personal data.

13. The knowledge information managing apparatus according to claim 9, wherein only additional knowledge information of the knowledge information is registered in the knowledge account.

14. The knowledge information managing apparatus according to claim 9, wherein the knowledge account includes an open account for opening the knowledge data registered by the account managing means.

15. An information storage medium storing a knowledge information managing program, said program being for utilizing a computer as:

a knowledge database for registering knowledge information therein;

knowledge opening means for opening the knowledge information registered in the knowledge database based on a theme selected by a user;

account managing means for registering the knowledge information associated with the theme selected by the user and opened by the knowledge opening means in a knowledge account, wherein the knowledge account is a storage area formed in an account database for every user, the knowledge information associated with the theme selected by the user is assigned a value point based on a number of times the knowledge information is stored in the knowledge account, and the knowledge information is displayed along with the value point, thereby providing the user with information to evaluate the usefulness of the knowledge information.

16. A knowledge information managing program for utilizing a computer as:

a knowledge database for registering knowledge information therein;

knowledge opening means for opening the knowledge information registered in the knowledge database based on a theme selected by a user;

account managing means for registering the knowledge information associated with the theme selected by the user and opened by the knowledge opening means in a knowledge account, wherein the knowledge account is a storage area formed in an account database for every user, the knowledge information associated with the theme selected by the user is assigned a value point based on a number of times the knowledge information is stored in the knowledge account, and the knowledge information is displayed along with the value point, thereby providing the user with information to evaluate the usefulness of the knowledge information.

* * * * *